(12) United States Patent
DeLuca

(10) Patent No.: US 9,630,638 B1
(45) Date of Patent: Apr. 25, 2017

(54) STORAGE CONTAINER WITH LID WHEELS

(71) Applicant: Lisa Seacat DeLuca, Baltimore, MD (US)

(72) Inventor: Lisa Seacat DeLuca, Baltimore, MD (US)

( * ) Notice: Subject to any disclaimer, the term of this patent is extended or adjusted under 35 U.S.C. 154(b) by 0 days.

(21) Appl. No.: 14/946,930

(22) Filed: Nov. 20, 2015

(51) Int. Cl.
*B62B 3/14* (2006.01)
*B65D 21/02* (2006.01)
*B65D 51/24* (2006.01)
*B60K 1/00* (2006.01)

(52) U.S. Cl.
CPC .................. *B62B 3/14* (2013.01); *B60K 1/00* (2013.01); *B65D 21/0233* (2013.01); *B65D 51/24* (2013.01)

(58) Field of Classification Search
CPC ..................................................... A45C 11/20
See application file for complete search history.

(56) References Cited

U.S. PATENT DOCUMENTS

| 4,331,341 A * | 5/1982 | McKeown | B62B 3/10 220/908 |
| 5,564,805 A | 10/1996 | Dickinson | |
| 6,763,558 B1 * | 7/2004 | Mytych | A61G 17/00 27/1 |
| 8,714,568 B2 * | 5/2014 | Allam | B62B 3/02 280/30 |
| 2007/0209846 A1 * | 9/2007 | Wilson | B65F 1/1468 180/65.1 |

\* cited by examiner

*Primary Examiner* — John Walters
*Assistant Examiner* — James Triggs

(57) ABSTRACT

A storage container in which a lid of the storage container has a set of lid wheels is disclosed. When the lid of the storage container is placed on the base of the storage container such that the lid and the set of lid wheels are below the base, the storage container can be moved by the set of lid wheels. The storage container can be moved manually or through the use of a motor such as a windup or electric motor. Furthermore, the storage container can have an appearance of a vehicle. Furthermore, the storage container can include a mechanism to attach the storage container to a second storage container. For example, attaching the first storage container's back to the front of the second storage container, can allow a train of storage containers to move together.

15 Claims, 4 Drawing Sheets

STORAGE CONTAINER WITH LID WHEELS

BACKGROUND

The present invention relates to the field of containers and, more particularly, to a storage container in which the lid of the storage container has a set of lid wheels.

Storage containers have been used to store and organize items for centuries. Some examples of items that could be stored in containers include, but not limited to: food, cleaning supplies, liquids, books, toys, crafts, clothes, hobbies, media, electronics, and beauty supplies. A container may have a base and a lid. The base is where the items are placed and can hold a larger volume than the lid. The lid is attached to the base allowing the container to be closed.

Many times families will have a container cabinet or drawer in their kitchen for easy access to containers to save food or leftovers for later consumption. Often times when families have young children they will babyproof their kitchen cabinets and drawers but leave the container cabinet or drawer accessible to the children as many containers are made of plastic. The children can explore and play with the containers in and out of the kitchen.

Typically containers do not include wheels. If the container includes wheels, the wheels are on the base of the container. Containers with wheels attached to the base of the container may allow a heavy container to be moved such as out from under a bed.

BRIEF SUMMARY

One aspect of the present invention can include a container in which a lid of the container has a set of lid wheels. The container base can be supported by the lid when the container base is inverted such that the container base is selectively mobilized on a support surface by the set of lid wheels. In this situation, the container may be moved by the set of lid wheels. The container can be moved manually or through the use of a motor such as a windup or electric motor. Additionally, the container base can have a flange at an upper peripheral flange and a receiving area such that the lid can be attached to the container base having a top surface having a predetermined thickness and a rim that extends below the top surface and that engages the upper peripheral flange of the container base and that locks the lid onto the container base. The lid may have two arcuate passages that extend in a transverse direction through the top surface of the lid. Additionally, a set of arcuate axle rod housing wherein each of the arcuate axle rod housing are secured within each of the arcuate passages. Additionally, a set of arcuate axle rods that are rotatably engaged within one of each of the set of axle rod housing. The set of lid wheels wherein one of each of the wheels rotatably engages an outer end of each of the ends of the arcuate axle rods. A set of fasteners that retain each of the wheels on the arcuate axle rods.

Another aspect of the present invention can include a container in which the lid of the container has a temporary set of lid wheels. In which case at least one of the arcuate axle rod housing, the arcuate axle rods, and the set of lid wheels can be temporarily removed from the lid. The temporary removal can be accomplished by disengaging the set of fasteners that retain each of the wheels on the arcuate axle rods. For example, the set of lid wheels can be attached to an axle which can be attached to the lid of the container by the use of an axle housing. If the axle housing is temporary, the wheels can be detachable by detaching the axle housing. The axle housing can be attached and later detached to the lid using any known materials or mechanism such as, but not limited to, magnets, hooks, fasteners, chains, string, screws, snaps, glue, or stickers. In yet another aspect of the invention, the axle housing can be permanent while the set of lid wheels can disconnect from the axle allowing the axle to detach from the axle housing, thus allowing the set of lid wheels to detach from the lid. Finally, the axle could detach from itself, allowing the axle to detach from the axle housing, thus allowing the set of lid wheels to detach from the lid.

Yet another aspect of the present invention can include the storage of the set of lid wheels, axle, or axle housing on the lid or base of the container when the lid wheels are not in use. The set of lid wheels, axle, or axle housing can be stored by folding, pushing inwards, screwing, gluing, taping, fastening, magnetizing, and snapping to the lid or base, to name a few.

Another aspect of the present invention can include a mechanism to attach the container to a second container. For example, attaching the first container's back to the front of the second container, can allow a train of containers to move together. Alternatively, the first and second containers can be attached together for storage, such as stacking the containers on top of one another. Finally, the first container may be nested inside the second container. For example, to minimize the amount of total space the containers occupy during storage.

DETAILED DESCRIPTION

The present invention discloses a container in which a lid of the container has a set of lid wheels. The container has a base and a lid. The lid attaches to the base to close the container. Attached to the lid is a set of lid wheels that can allow the container to roll when the container is placed such that the lid and the set of lid wheels are below the base. An advantage of placing the set of lid wheels on the lid instead of on the base is the container is able to give off the appearance of a vehicle for entertainment value. Additionally, when storing leftovers, the container does not roll around and is therefore less likely to damage or spill the contents as the lid and the set of lid wheels would be above the base of the container which holds the items.

Figure 1A:
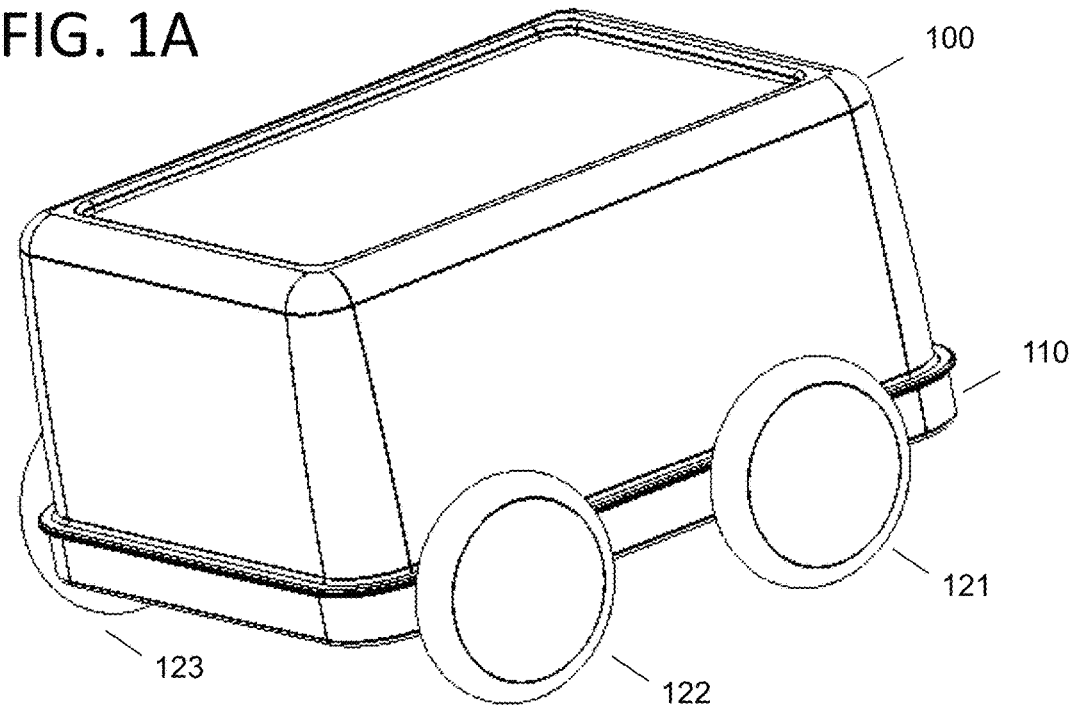
FIG. 1A is a schematic illustration of a container (100) showing a top, front, and left view, in which the lid of the container has a set of lid wheels in accordance with one embodiment.

FIG. 1A is a schematic illustration of a container (100) showing a top, front, and left view, in which the lid of the container has a set of lid wheels in accordance with one embodiment. The base of the container (100) can hold items and is larger in volume than the lid (110). The items can include but are not limited to food, cleaning supplies, liquids, books, toys, crafts, clothes, hobbies, media, electronics, and beauty supplies. The base of the container (100) can also include compartments or dividers that allow multiple items to be stored inside the container and can be kept separate using the different compartments. Attached to the container lid (110) is a set of lid wheels (121, 122, 123). The set of lid wheels can include at least one wheel.

A container user can close the container (100) by placing the lid (110) on the base (100). Additionally, there can exist a seal mechanism between the lid and the base to create a tight seal and can allow items inside the container to stay fresh. The lid is attached to the container base having a top surface having a predetermined thickness and a rim (111) that extends below the top surface and that engages the upper peripheral flange of the container base and that locks the lid onto the container base. The lid can have two arcuate passages that extend in a transverse direction through the top surface of the lid (110). The container user can place the container base such that the container base (100) is supported by the lid (110) and the set of lid wheels (121, 122, 123) when the container base (100) is inverted. The container can then roll using the set of lid wheels (121, 122, 123) if the set of lid wheels (121, 122, 123) can be rolled. For example, if the set of lid wheels (121, 122, 123) cannot be rolled, they can be present to give an appearance of a vehicle.

As used herein, the set of lid wheels (121, 122, 123) can be temporarily or permanently attached to the lid (110). Further, the lid (110) can be partially, or completely detachable from the base (100). For example, the lid (110) can be attached to the base (100) using a hinge so that the lid (110) is never separated from the base (100).

Figure 1B:
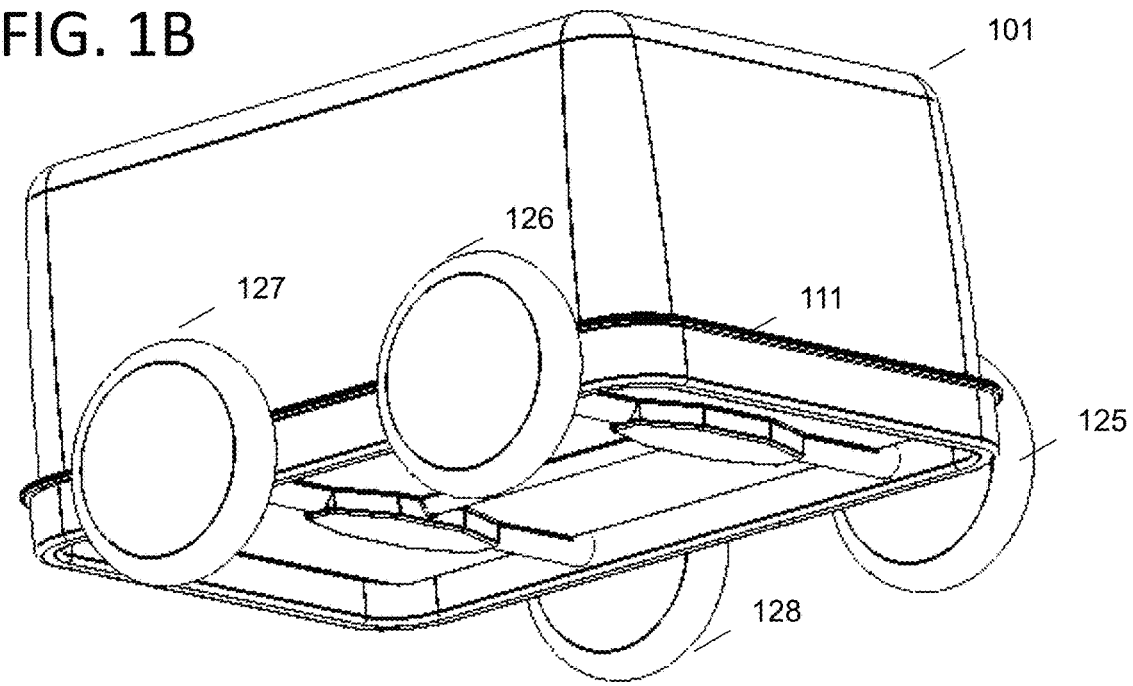
FIG. 1B is a schematic illustration of a container (101) showing a back, bottom, and left view, in which the lid of the container has a set of lid wheels in accordance with one embodiment.

FIG. 1B is a schematic illustration of a container (101) showing a back, bottom, and left view, in which the lid of the container has a set of lid wheels in accordance with one embodiment. This schematic illustration provides an additional view to FIG. 1A. The set of lid wheels (125, 126, 127, 128) can be attached to the lid which can be attached to the container base (101) having a top surface having a predetermined thickness and a rim that extends below the top surface and that engages the upper peripheral flange of the container base and that locks the lid onto the container base (111).

Figure 2:
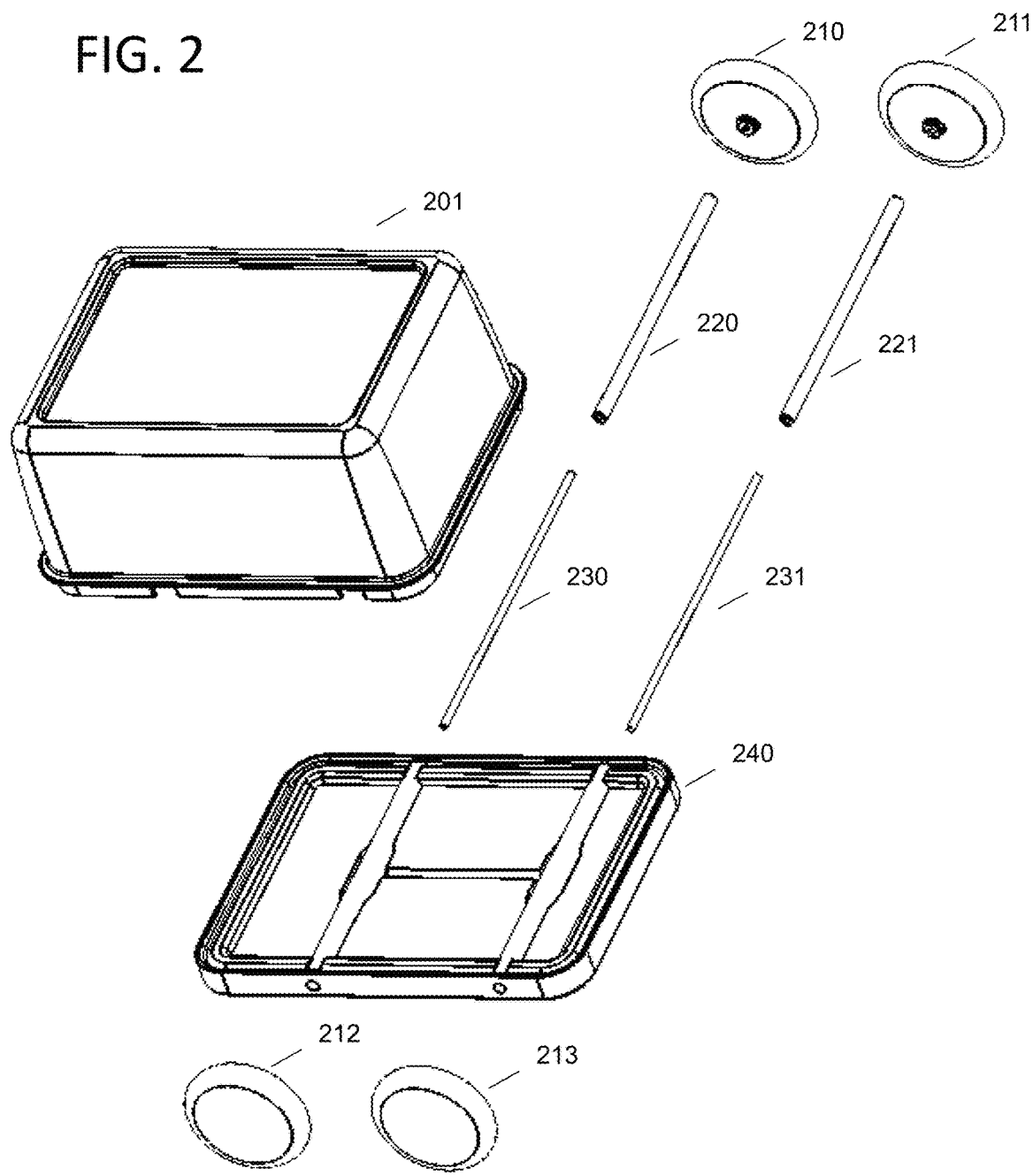
FIG. 2 is a schematic illustration of a container (201) in which the lid of the container has a set of lid wheels shown in an exploded view in accordance with one embodiment.

FIG. 2 is a schematic illustration of a container (201) in which the lid of the container (240) has a set of lid wheels shown in an exploded view in accordance with one embodiment. The lid has a set of arcuate passages that extend in a transverse direction through the top surface of the lid (240). In the exploded view, there are four wheels (210, 211, 212, 213). The use of a arcuate axle rod is used to attach two of the wheels on opposite sides together. For example, arcuate axle rod (230) attaches wheel (210) to wheel (212) and arcuate axle rod (231) attaches wheel (211) to wheel (213). The set of lid wheels rotatably engage an outer end of each of the ends of the arcuate axle rods. To allow the set of lid wheels (210, 211, 212, 213) and the set of arcuate axle rods (230, 231) to rotate together, the arcuate axle rods (230, 231) are housed within a set of arcuate axle rod housings (220, 221) secured within a set of arcuate passages (240). The arcuate axle rod housings (220, 221) are then temporarily or permanently secured within each of the arcuate passages within the container lid (240). The container can be closed by attaching the lid (240) to the base (201). Since the wheels (210, 211, 212, 213) can rotate together with the arcuate axle rods (230, 231), the container can roll if the lid (240) and the set of lid wheels (210, 211, 212, 213) are inverted such that the container base (201) is selectively mobilized on a support surface by the set of lid wheels (210, 211, 212, 213).

For example, suppose a child is playing with the container cabinet while a parent is preparing lunch. The container can be assembled by attaching the lid with arcuate passages (240) containing the set of lid wheels (210, 211, 212, 213), arcuate axle rods (230, 231), and arcuate axle rod housings (220, 221) to the base (201) of the container having a flange at an upper peripheral flange and a receiving area. The lid that is attached (240) having a top surface having a predetermined thickness and a rim that extends below the top surface and that engages the upper peripheral flange of the container base and that locks the lid onto the container base. The child can then pretend the container is a car, rolling the container around the kitchen. Furthermore, depending on how the arcuate axle rod housings (220, 221) and/or the arcuate axle rods (230,231) are attached to the lid, the container can turn in multiple directions and not be confined to just forward and backward, thus allowing the container to turn left or right.

Figure 3:
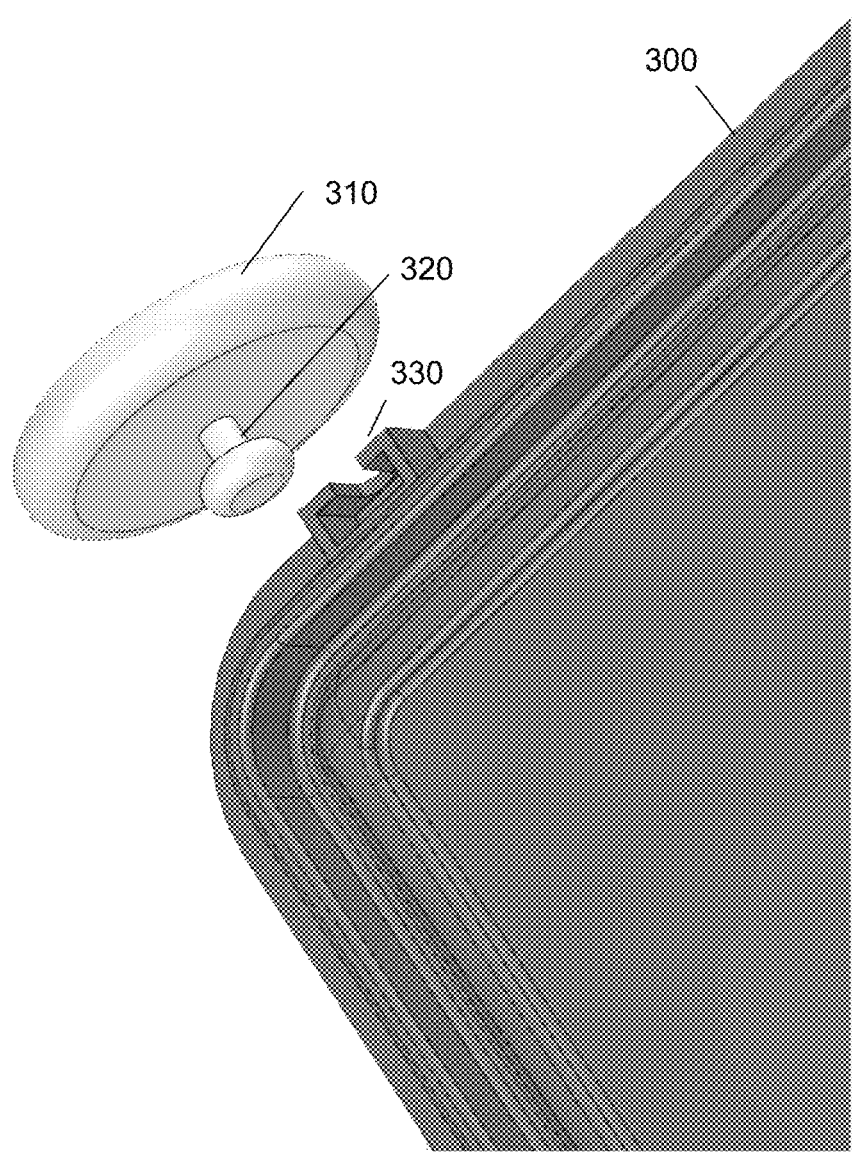
FIG. 3 is a schematic illustration of a container (300) in which the lid of the container has a set of lid wheels and each wheels has a separate axle in accordance with one embodiment.

FIG. 3 is a schematic illustration of a container (300) in which the lid of the container has a set of lid wheels and each wheel has a separate axle in accordance with one embodiment. The illustration shows an alternative to an axle that stretches the entire width of the lid (320). Located on the lid (300) is an arcuate axle rod housing (330) shaped substantially similar to a u-shape that houses an axle (320), which attaches the wheel (310) to the lid (300). The wheel (310) and the arcuate axle rod (320) rotate together inside the arcuate axle rod housing (330). The axle rod housing (330) as shown allows the wheel (310) to be easily disconnected from the lid (300) for temporary attachment and/or detachment.

For example, suppose a user wishes to use a container in which the lid of the container has a set of lid wheels to store food leftovers in the fridge. While it can be possible to stack the container inside the fridge with the wheels attached, the user can detach the set of lid wheels for storage. In which case, if the set of lid wheels are temporarily attached, the user can detach the set of lid wheels for storage. The set of lid wheels and/or axle can be folded, pushed inwards, screwed, glued, taped, fastened, magnetized, snapped, or otherwise secured to the lid and/or base for storage. In addition to storing the set of lid wheels and/or axle, a utensil such as a spoon, fork, or knife can also be stored on the lid and/or base of the container. For example, if a fork were attached to the lid and a user wished to eat some leftovers inside of the container they would be able to use the fork that was attached to the lid.

Figure 4:
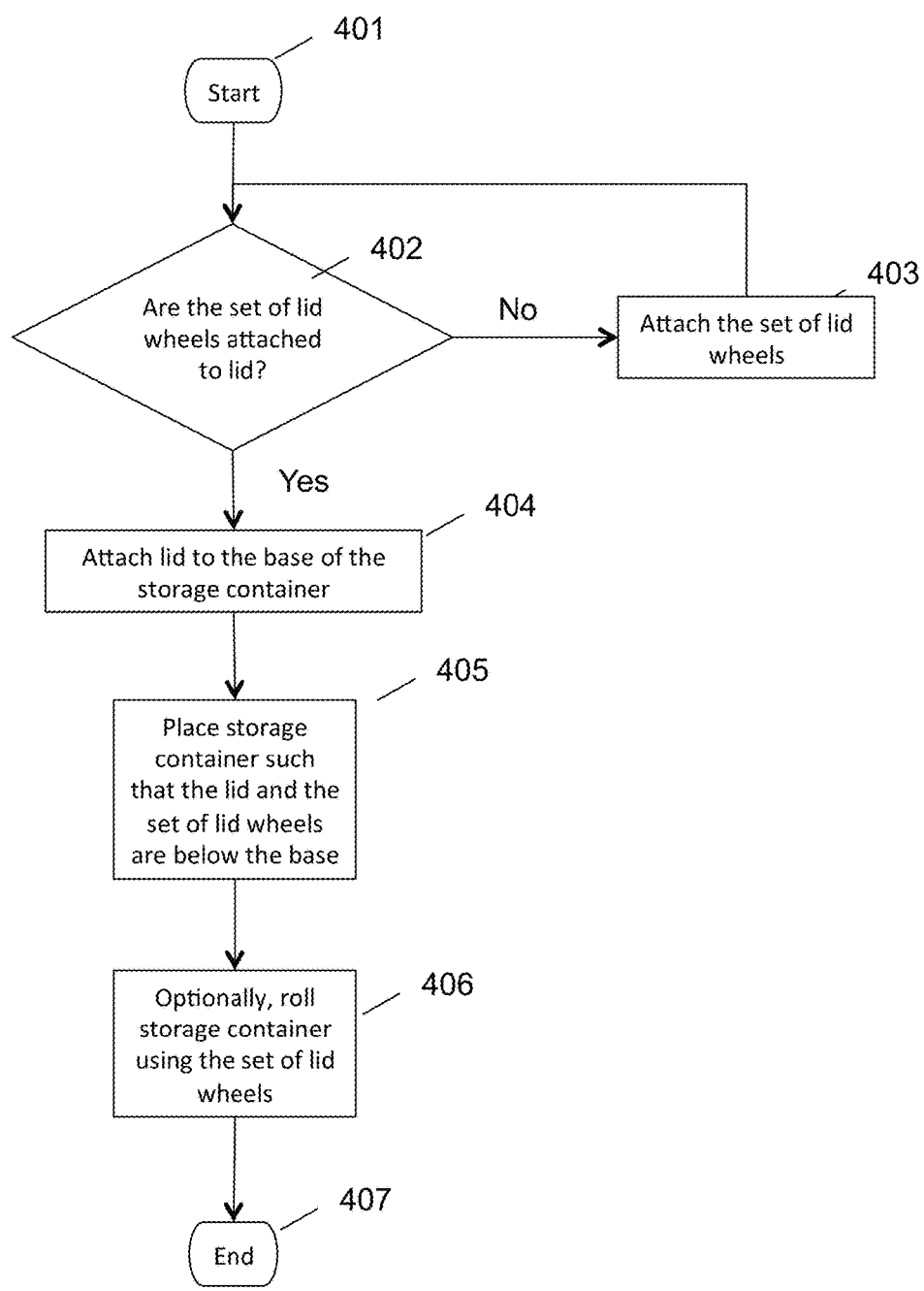
FIG. 4 is flowchart (401) of a process taken by a container user in which the lid of the container has a set of lid wheels in accordance with one embodiment.

FIG. 4 is flowchart (401) of a process taken by a container user in which the lid of the container has a set of lid wheels in accordance with one embodiment. The user would first determine if the set of lid wheels are attached to the lid (402) in the case where the set of lid wheels can be temporary this decision would require the user to attach the set of lid wheels (403) if the set of lid wheels were not attached. If the set of lid wheels are permanently attached to the container this decision step would default to the yes path. Next, the user would attach the lid to the base of the container (404). Once the lid is attached, the user would place the container such that the lid and the set of lid wheels are below the base (405). This would allow the set of lid wheels to rotate, if the set of lid wheels can rotate, so that the container can move.

Optionally, the user could then roll the container using the set of lid wheels (406). If they choose to open the container, the process ends (407).

The movement can be done manually by the user or automatically through the use of a motor such as a wind up motor or an electric powered motor. For example, an electric powered motor can be battery powered or require a it be plugged into an outlet for electricity. Furthermore, the container can be moved by remote control such as the use of a radio or over a network such as bluetooth or wifi. For example, a mobile application can exist that can control whether the container drives a certain direction and/or speed.

The diagrams in FIGS. 1-4 illustrate the architecture, functionality, and operation of possible implementations of systems, and methods, according to various embodiments of the present invention. In this regard, in some alternative implementations, the functions noted in the block diagrams and/or flowchart illustrations, may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A container in which a lid of the container has a set of lid wheels, comprising:
   a container base having a flange at an upper peripheral flange and a receiving area;
   the lid that is attached to the container base having a top surface having a predetermined thickness and a rim that extends below the top surface and that engages the upper peripheral flange of the container base and that locks the lid onto the container base;
   wherein the lid has two arcuate passages that extend in a transverse direction through the top surface of the lid;
   a set of arcuate axle rod housings wherein each of the arcuate axle rod housings are secured within each of the arcuate passages;
   a set of arcuate axle rods that are rotatably engaged within one of each of the set of axle rod housings;
   the set of lid wheels wherein one of each of the wheels rotatably engages an outer end of each of the ends of the arcuate axle rods;
   a set of fasteners that retain each of the wheels on the arcuate axle rods;
   and wherein the container base is supported by the lid when the container base is inverted such that the container base is selectively mobilized on a support surface by the set of lid wheels.

2. The container of claim 1, further comprising the lid wheels and the axle rods rotating together.

3. The container of claim 1, wherein the axle rod housing is one of: a permanent axle rod housing and a temporary axle rod housing.

4. The container of claim 1, wherein the axle rod is one of: a permanent axle rod and a temporary axle rod.

5. The container of claim 1, wherein the set of lid wheels is one of: a permanent set of lid wheels and a temporary set of lid wheels.

6. The container of claim 5, wherein the temporary set of lid wheels are stored, when the temporary set of lid wheels are not in use, on one of: the lid and the base.

7. The container of claim 6, for storing the temporary set of lid wheels comprising at least one of the following: folding, pushing inwards, screwing, gluing, taping, fastening, magnetizing, and snapping.

8. The container of claim 1, further comprising moving the container using the set of lid wheels when the container is inverted such that the container base is selectively mobilized on a support surface by the set of wheels.

9. The container of claim 1, further comprising a mechanism to attach the container to a second container.

10. The container of claim 1, wherein the set of lid wheels move to allow the container to change direction.

11. The container of claim 1, wherein the container has an appearance of a vehicle.

12. The container of claim 1, wherein the base has at least one of a storage compartment.

13. The container of claim 1, further comprising a utensil attached to the container.

14. The container of claim 1, wherein the container is made of at least one of: glass, metal, wood, cloth, and plastic.

15. The container of claim 1, wherein the container is nested inside a second container.

* * * * *